April 13, 1965   M. E. WILKE   3,178,316
RESERVE BATTERY
Filed Aug. 2, 1960   2 Sheets-Sheet 1
Fig. 1
Fig. 2
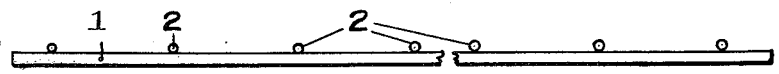
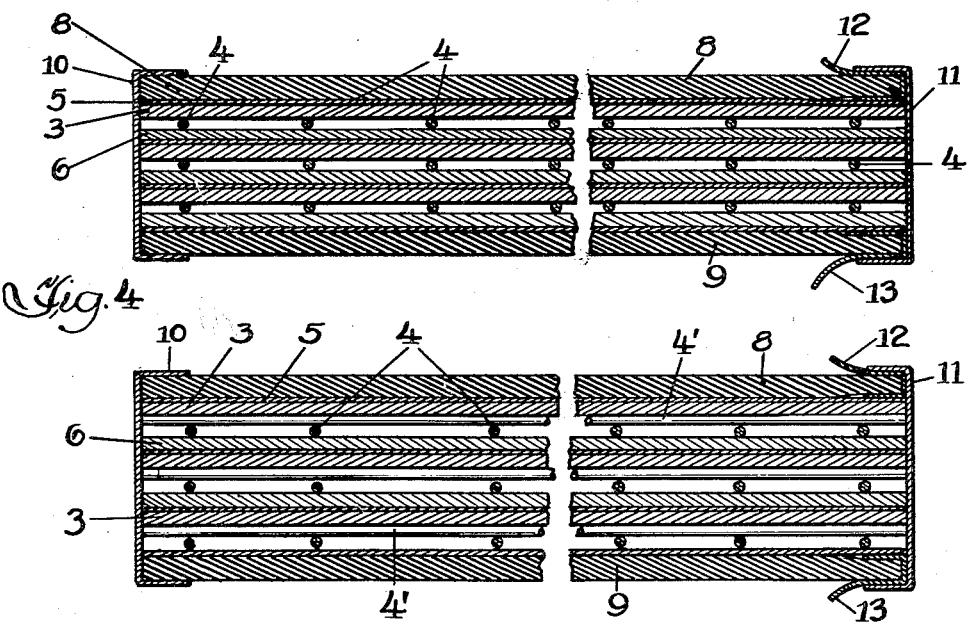
Fig. 4
Fig. 5
Inventor,
Milton E. Wilke,
By: Jones, Darbo & Robertson, Attys.

April 13, 1965   M. E. WILKE   3,178,316
RESERVE BATTERY
Filed Aug. 2, 1960   2 Sheets-Sheet 2

Inventor,
Milton E. Wilke,
By: Jones, Darbo & Robertson, Attys.

United States Patent Office 3,178,316
Patented Apr. 13, 1965

3,178,316
RESERVE BATTERY
Milton E. Wilke, Freeport, Ill., assignor to Servel, Inc., Evansville, Ind., a corporation of Delaware
Filed Aug. 2, 1960, Ser. No. 46,914
7 Claims. (Cl. 136—100)

This invention relates to reserve batteries, and more particularly refers to a method for providing an improved separator for maintaining proper spacing between the electrodes thereof and to the improved batteries produced thereby.

Reserve batteries have proven to be particularly well adapted for uses where they must be stored over a considerable length of time without any appreciable loss of capacity, and where they may be activated by being immersed in an electrolyte or in sea water. Such reserve batteries are able to furnish extremely large currents with respect to their physical dimensions, and are especially useful for powering military devices such as proximity fuses, emergency signaling apparatus and sonobuoys.

Reserve batteries designed for the uses described are generally comprised of a plurality of cells each having a sheet-form magnesium anode, a sheet-form silver chloride cathode, and a separator contained between the electrodes for maintaining them spaced apart, and for providing space within which to retain the cell electrolyte when the battery is activated. One means of providing such a separator is by interposing a plurality of layers of a bibulous material such as Webril. In other structures, spacing means such as glass beads are placed between the electrodes.

Separators comprised of Webril are objectionable for certain applications since they do not absorb the electrolyte rapidly enough. Glass beads have an advantage over Webril in that they permit ready access of the electrolyte into the interelectrode spaces. However, they are extremely difficult to handle and apply to the electrodes when used in a sufficiently small size, and the resulting batteries are prohibitively expensive.

It is an object of the present invention to provide a separator to be used between the electrodes of a reserve battery to prevent them from shorting and to provide space for the electrolyte to fill and activate the battery immediately upon its being dropped or otherwise immersed into the electrolyte.

It is further an object to provide such a structure which will permit large amounts of electrolyte to enter and be retained within the battery in order to enable it to function over an extended period of time after it has been activated.

It is further an object to provide such a separator which will permit close and precise spacing between the electrodes to diminish the internal resistance of the battery in order to insure rapid current build up.

It is still further an object to provide a structure which is extremely rugged and insensitive to shock.

It is still further an object to provide a method for applying a separator to at least one of the electrodes of each cell of a reserve battery, which method is inexpensive to carry out and lends itself to mass production methods.

Other objects and advantages of the present invention will become apparent from the following description and accompanying drawings in which:

FIG. 1 is a plan view of a combined electrode and separator according to the invention.

FIG. 2 is a cross-sectional view of the electrode shown in FIG. 1.

FIG. 4 is a cross-sectional view of a battery formed of a plurality of assembly units.

FIG. 5 is a cross-section of a battery formed of a plurality of assembly units of somewhat modified form.

Figure 3:
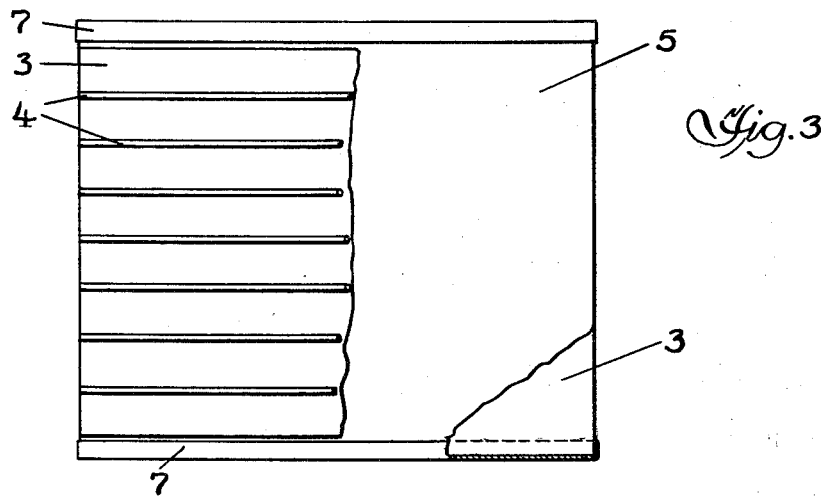
FIG. 3 is a plan view in somewhat broken form of an assembly unit according to the invention.

According to the present invention, the novel separator may be applied to a surface of an electrode of each cell of a reserve battery by first applying an adhesive to a filament or plurality of filaments of a plastic material, applying the filaments to a surface of the electrode in spaced-apart relationship, and causing the adhesive to set.

According to one improved version of the invention, plastic filaments may be applied to the engaging faces of each of two adjacent electrodes, the filaments being applied to one electrode in an arrangement substantially perpendicular to those of the other electrode. This arrangement permits the entering electrolyte to spread out over the surfaces of the electrodes in all directions.

According to a still further improved version of the invention, resinous filaments are provided on one electrode of each cell, and the other electrode is provided with corrugations. The electrodes are then so arranged that the corrugations of one electrode cross the plastic filaments of the other electrode. As a result of this structure, flow paths for the electrolyte are provided in both directions. Moreover, variable inter-electrode spacing is provided by the corrugated electrode, permitting portions of one electrode to be closely spaced to the other electrode to provide rapid current build-up when the battery is first activated, and other portions to be further spaced for normal service. The plastic filaments permit spacing of the electrodes with great precision.

Referring to the drawings, in FIGS. 1 and 2 an electrode 1 is shown to which a plurality of nylon monofilaments 2 have been cemented to form a separator. The monofilaments may be applied to either the positive electrode composed of a material such as silver chloride, or the negative electrode, composed of a material such as magnesium.

The present structure additionally is well suited for the formation of duplex electrode sub-assemblies in which the anode of one cell and the cathode of an adjacent cell are assembled as a single unit. A plurality of duplex sub-assemblies may then be placed in stacked relationship and assembled into a battery. Such a structure is strong, relatively inexpensive to fabricate and occupies an exceptionally small space.

A duplex electrode sub-assembly is shown in somewhat broken form in FIG. 3 and comprises a magnesium anode 3 having a plurality of parallel nylon monofilaments 4 cemented to the exposed face of the anode. Beneath the anode 3 is a thin metal foil sheet 5 composed of silver or a silver plated metal such as copper, which functions to connect the anode and cathode electrically while preventing electrolytic action therebetween. The silver chloride electrode 6 is cemented to one side of the foil 5. The anode 3 is spot welded to the other side of foil 5. Tape strips 7 of Mylar are placed about the edges of the magnesium electrode.

FIG. 4 illustrates a battery assembly formed by stacking together a plurality of duplex electrode sub-assemblies similar to the one shown in FIG. 3. In addition to the above-enumerated elements, two paperboard plates 8 and 9 serve as a portion of the enclosure. The two plates are joined at the edges by tape 10 and 11 as shown in FIG. 4. Terminal strips 12 and 13 composed of a material such as silver foil contact the terminal electrodes and provide electrical connection for the battery assembly.

In the structure shown in FIG. 5, one set of nylon monofilaments 4 is applied to one electrode, and another set of nylon filaments 4' applied to the other electrode. The adjacent electrodes are so arranged that one set of monofilaments is substantially perpendicular to the other set, contiguous thereto enabling the incoming electrolyte or activating liquid to fill the interelectrode space in all directions. External electrical connection with the battery is supplied by the silver foil strips 12 and 13.

Figure 6:
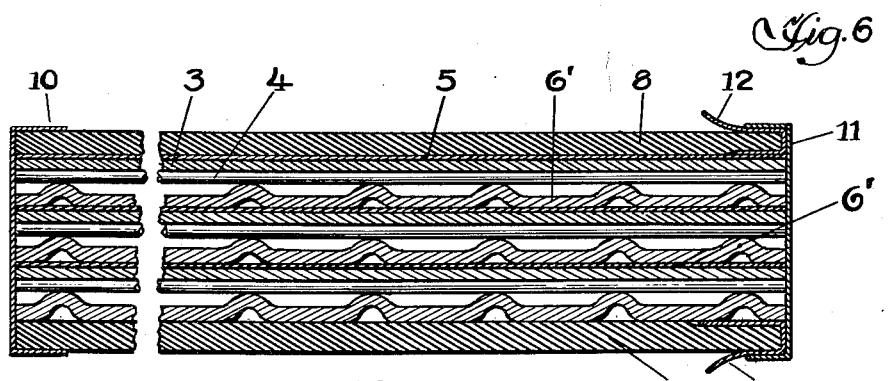
FIG. 6 is a cross-section of a battery formed of a plurality of assembly units in still further modified form.

In the battery shown in FIG. 6, the nylon monofilaments 4 are cemented to the magnesium anode 3. In order to enable the activating electrolyte to move transversely to the monofilament, the silver chloride electrode 6' is provided with corrugations in an angular direction and preferably substantially perpendicular to the monofilaments. Alternatively, the monofilaments may be cemented to the silver chloride electrode 6' which may then be retained in a flat condition, and the magnesium anode may be corrugated. This structure has at least two important functions. First, as previously stated, the activating electrolyte is permitted to move perpendicular to the monofilaments so that it can quickly activate the entire cell even though only one edge or a portion thereof is exposed. Second, limited areas of the silver chloride cathode are positioned very close to the anode so that an exceptionally high current build-up can be obtained immediately upon activation. Moreover, the remaining portions of the silver chloride cathodes are maintained spaced a greater distance from the anode to permit these portions to engage in electrolytic action at a greater distance from the other electrode, and consequently at a slower rate, after the initial build-up has been attained. The silver foil or silver plated copper foil sheets 5 are spot welded to one side of each anode to provide electrical connections with the anode, and the corrugated silver chloride cathodes 6' are cemented to the other side of the foil sheets. As a result, a duplex sub-assembly is formed comprised of the anode of one cell and the cathode of an adjacent cell. A plurality of duplex electrode cell assemblies are placed in stacked relationship and enclosed within a container formed from paper board plaques 8 and 9. The paper board plaques are taped together at their edges by tape strips 10 and 11. Silver foil terminals 12 and 13 are placed in contact with the respective electrodes to provide external terminal connections.

Figure 7:
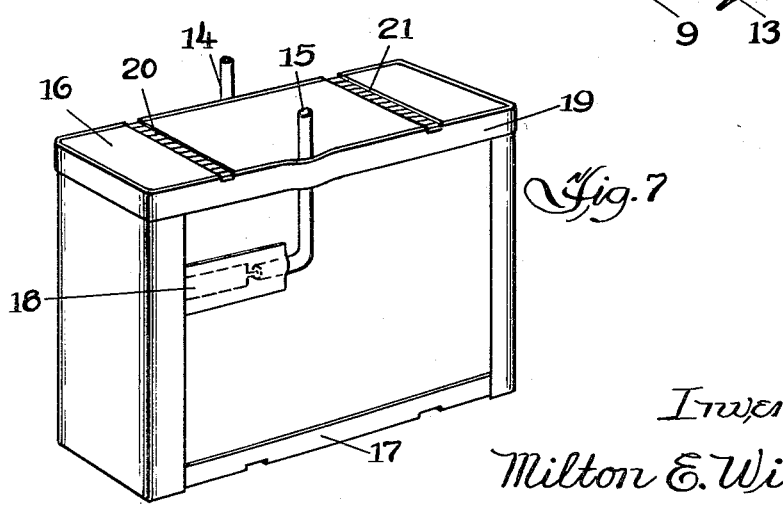
FIG. 7 is a perspective view of a completely assembled battery.

A completed battery is shown in FIG. 7 having terminal wires 14 and 15 connected to the silver foil terminals 11 and 12, said structures being shown in detail in the battery assembly of FIG. 6. The enclosure is completed by an upper tape strip 16 and lower tape strip 17.

Short strips of tape 18 protect and insulate the connection of the terminal wires 14 and 15 with the silver foil terminals. A marginal tape 19 maintains the terminal wires 14 and 15 affixed to the sides of the battery. Slot openings 20 and 21 and similar slots, not shown, on the bottom of the battery provide entrance means for the activating electrolyte and exit means for the displaced air.

Magnesium or a magnesium alloy is generally used as an anodic material. Other suitable anodic metals such as, for example, zinc may be used.

The preferred cathode depolarizer is silver chloride, although other suitable depolarizers such as cuprous chloride may be used. The depolarizer sheet may be formed by rolling a preformed solid slab of silver chloride through a rolling mill at a temperature sufficiently elevated to render the material malleable. This silver chloride cathode may also be formed by electrolysis, according to known methods. The surfaces of the cathode may be developed in a photographic developer to form a thin silver layer thereover for better current connection and distribution along the cathode surfaces.

The plastic filaments, from which the separator is prepared may be applied to either the magnesium anode or the silver chloride cathode. Where a flat cathode is utilized, it may be preferable to apply the filaments to the cathode, since the critical magnesium surface area will not be reduced thereby. However, if corrugated silver chloride cathodes are used, the filaments are applied to the magnesium anode. The combination separator and electrode may be formed by continuously passing a plurality of separate filaments through a liquid adhesive contained in a tank, and then applying them in substantially parallel arrangement to a moving stock strip of either magnesium or sheet-form silver chloride. The moving strip may then be passed under heat lamps to cause the adhesive to set rapidly, and subsequently rolled into a stock roll. The rolled electrode stock is then cut to form individual electrodes of the desired size. Although nylon monofilament is the preferred material for forming separators, other plastic filaments may be used. The filaments may be either stranded or in the form of a monofilament, the monofilament form being preferred.

The silver chloride strip may be corrugated by means of embossing rollers. In assembling the cell, the corrugations are arranged to cross the plastic filaments and preferably are oriented substantially perpendicular to them. The various thicknesses of the filament may be used dependent upon the degree of electrode spacing required. Filaments having a diameter of .010 inch have been found very satisfactory.

Separators may be applied to reserve cell electrodes by the present method considerably less expensively and in a shorter period of time than in the methods taught in the prior art. Moreover, the resulting structure is extremely strong and resistant to shock. A considerable saving in space is also achieved over prior art structures.

Although the present invention has been described in relation to only relatively few embodiments, it is to be understood that many variations may be practiced by those skilled in the art without departing from the spirit or the scope of the invention as defined by the appended claims.

What is here claimed is:

1. A duplex cell unit for reserve batteries comprising a sheet-form anode, a sheet-form cathode provided with a plurality of substantially parallel spaced-apart corrugations, a metal foil sheet having at least its surfaces composed of silver interposed between and affixed to one face of each of said anode and said cathode, and a separator comprised of a plurality of substantially parallel spaced-apart plastic filaments affixed to the other side of said anode, said filaments intersecting said corrugations of the adjacent electrode at an angle to thereby allow the flow of electrolyte therebetween.

2. A unit according to claim 1 wherein said separator is comprised of nylon monofilaments.

3. A unit according to claim 1 wherein said anode is composed of magnesium and said cathode is composed of silver chloride.

4. A reserve battery comprising a plurality of duplex cell units in stacked relationship, each of said units comprising a sheet-form anode, a sheet-form cathode provided with a plurality of spaced-apart corrugations, a sheet-form electronic connection-providing means interposed between and affixed to one surface of each of said anode and said cathode, a separator comprised of a plurality of plastic filaments affixed to the other side of said anode in spaced-apart arrangement, said filaments intersecting said corrugations of the adjacent electrode at an angle to thereby allow the flow of electrolyte therebetween, and an enclosure for said battery.

5. A reserve battery according to claim 4 wherein said filaments are comprised of nylon monofilament.

6. A reserve battery according to claim 4 wherein said anode is comprised of magnesium and said cathode is comprised of silver chloride.

7. A reserve battery according to claim 4 wherein said electronic connection-providing means is comprised of silver-plated copper foil.

References Cited by the Examiner

UNITED STATES PATENTS

| | | | |
|---|---|---|---|
| 1,332,483 | 3/20 | Bridge | 136—90 |
| 2,590,584 | 3/52 | Taylor | 136—100 |
| 2,663,749 | 12/53 | Warner et al. | 136—100 |
| 2,931,849 | 4/60 | Burrell | 136—90 |
| 2,988,587 | 6/61 | Haring | 136—90 |
| 3,005,864 | 10/61 | Sharpe | 136—100 |

FOREIGN PATENTS 610,719   10/48   Great Britain.

JOHN H. MACK, *Primary Examiner.*

JOSEPH REBOLD, MURRAY TILLMAN, *Examiners.*